US010277069B2

(12) United States Patent
Chang et al.

(10) Patent No.: US 10,277,069 B2
(45) Date of Patent: Apr. 30, 2019

(54) WIRELESS POWER TRANSMITTER

(71) Applicant: Samsung Electro-Mechanics Co., Ltd., Suwon-si (KR)

(72) Inventors: Ki Won Chang, Suwon-si (KR); Si Hyung Kim, Suwon-si (KR); Hee Sun Han, Suwon-si (KR); Ji Hoon Kim, Suwon-si (KR); Sung Uk Lee, Suwon-si (KR); Chang Mok Han, Suwon-si (KR); Duk Won Seo, Suwon-si (KR); Eun Young Shin, Suwon-si (KR); Hyun Keun Lim, Suwon-si (KR); Isaac Nam, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 794 days.

(21) Appl. No.: 14/815,272

(22) Filed: Jul. 31, 2015

(65) Prior Publication Data
US 2016/0036245 A1    Feb. 4, 2016

(30) Foreign Application Priority Data

Aug. 1, 2014   (KR) .................... 10-2014-0099234
Apr. 7, 2015   (KR) .................... 10-2015-0049246

(51) Int. Cl.
*H02J 50/10* (2016.01)
*H01F 38/14* (2006.01)
(Continued)

(52) U.S. Cl.
CPC .............. *H02J 50/10* (2016.02); *H01F 27/38* (2013.01); *H01F 38/14* (2013.01); *H02J 7/0044* (2013.01);
(Continued)

(58) Field of Classification Search
CPC .................................. H02J 7/025; H02J 50/23
See application file for complete search history.

(56) References Cited

U.S. PATENT DOCUMENTS 4,896,063 A * 1/1990 Roberts .................... H02K 3/16
310/184
5,517,104 A * 5/1996 Kawakami ........... G01R 15/183
324/117 R
(Continued)

FOREIGN PATENT DOCUMENTS

CN    102570630 A    7/2013
EP    2396896 B1 *  3/2018
(Continued)

OTHER PUBLICATIONS

Zheng, et.al., "Investigation of a Novel 24-slot/14-pole six-phase fault-Tolerant Modular Permanent-Magnet in-wheel Motor for Electric Vehicles," 2013, Energies, pp. 4980-5002.*
(Continued)

*Primary Examiner* — Thienvu V Tran
*Assistant Examiner* — Pinping Sun
(74) *Attorney, Agent, or Firm* — NSIP Law

(57) ABSTRACT

A wireless power transmitter includes a case including a base plate and a structure disposed on the base plate; and a transmitting coil having a three-dimensional spiral shape disposed on a side surface of the structure and configured to generate a magnetic field in a direction perpendicular to the side surface of the structure.

20 Claims, 14 Drawing Sheets

(51) Int. Cl.
  *H02J 7/00* (2006.01)
  *H02J 7/02* (2016.01)
  *H02J 50/40* (2016.01)
  *H02J 50/12* (2016.01)
  *H02J 50/23* (2016.01)
  *H01F 27/38* (2006.01)

(52) U.S. Cl.
  CPC .............. *H02J 7/025* (2013.01); *H02J 50/12* (2016.02); *H02J 50/23* (2016.02); *H02J 50/40* (2016.02)

(56) References Cited

U.S. PATENT DOCUMENTS

| | | | | |
|---|---|---|---|---|
| 6,567,053 | B1* | 5/2003 | Yablonovitch | H01Q 13/12 343/700 MS |
| 2006/0220971 | A1* | 10/2006 | Sato | G04G 21/04 343/718 |
| 2010/0237709 | A1* | 9/2010 | Hall | B60L 11/182 307/104 |
| 2011/0140653 | A1* | 6/2011 | Jung | H02J 50/12 320/108 |
| 2011/0222154 | A1 | 9/2011 | Choi et al. | |
| 2012/0019075 | A1* | 1/2012 | Cho | H01F 38/14 307/104 |
| 2012/0089202 | A1* | 4/2012 | Staller | A61N 1/37229 607/61 |
| 2012/0169278 | A1* | 7/2012 | Choi | H04B 5/0037 320/108 |
| 2014/0152116 | A1* | 6/2014 | Kim | H01F 38/14 307/104 |
| 2014/0184155 | A1* | 7/2014 | Cha | H02J 7/025 320/109 |
| 2014/0232202 | A1* | 8/2014 | Ichikawa | H01F 38/14 307/104 |
| 2015/0326063 | A1* | 11/2015 | Leabman | H02J 7/0042 320/108 |
| 2015/0377016 | A1* | 12/2015 | Ahmad | E21B 47/16 340/855.8 |

FOREIGN PATENT DOCUMENTS

| | | |
|---|---|---|
| JP | 7-106170 A | 4/1995 |
| JP | 2014-90606 A | 5/2014 |
| KR | 10-2011-0102758 A | 0/9201 |
| KR | 10-2012-0010652 A | 2/2012 |
| KR | 10-2012-0078995 A | 7/2012 |
| KR | 10-1261267 B1 | 5/2013 |
| KR | 10-1397668 B1 | 5/2013 |
| KR | 10-2013-0064872 A | 6/2013 |
| WO | WO 2012/093823 A2 | 7/2012 |

OTHER PUBLICATIONS

Saynak, "Novel Rectangular Spiral Antennas," 2007, Master Thesis, pp. 1-37.*
Astrom, "Productivity improvements in Assembly," Jun. 2014, pp. 1-72.*
Korean Office Action dated Sep. 6, 2016 in counterpart Korean Application No. 10-2015-0049246 (16 pages in Korean with English translation).
Chinese Office Action dated May 18, 2017, corresponding to Chinese Application No. 201510463078.1 (14 pages in English, 8 pages in Chinese).

* cited by examiner

WIRELESS POWER TRANSMITTER

CROSS-REFERENCE TO RELATED APPLICATION(S)

This application claims the benefit under 35 USC 119(a) of Korean Patent Application Nos. 10-2014-0099234 filed on Aug. 1, 2014, and 10-2015-0049246 filed on Apr. 7, 2015, in the Korean Intellectual Property Office, the entire disclosures of which are incorporated herein by reference for all purposes.

BACKGROUND

1. Field

This application relates to a wireless power transmitter.

2. Description of Related Art

Technology for wirelessly transmitting power is being used for wearable devices such as smartwatches, as well as for mobile devices such as cellular phones, smartphones, and tablet PCs. Particularly, since wearable devices are devices that are worn on the human body while in use, such devices to moisture need to be resistant to moisture, such as sweat and water, to ensure their durability. If a wearable device includes an exposed external terminal for performing wired charging, a problem due to corrosion of the terminal or other damage may occur. Therefore, such wearable devices may obtain increased durability through the technology of wirelessly transmitting power.

In the case of wearable devices, however, it may be structurally difficult to dispose a receiving coil wirelessly receiving power and a transmitting coil wirelessly transmitting power to be parallel to each other during operations thereof, resulting in a low wireless power transmission efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a case including a base plate and a structure disposed on the base plate; and a first coil having a three-dimensional spiral shape disposed on a side surface of the structure and configured to generate a magnetic field in a direction perpendicular to the side surface of the structure.

The first coil may be constituted by a single wire.

The first coil may include a plurality of layers in the direction perpendicular to the side surface of the structure.

The structure may include a slot formed in the side surface of the structure and extending in a direction perpendicular to the base plate; and a portion of the first coil extending in the direction perpendicular to the base plate may be disposed in the slot.

A first end of the structure may be disposed on the base plate; and the wireless power transmitter may further include a second coil having a spiral shape disposed on an end surface of the structure at a second end of the structure opposite to the first end of the structure.

The first coil and the second coil may be constituted by a single wire that forms both the first coil and the second coil.

The structure may include a slot formed in the side surface of the structure and extending in a direction perpendicular to the base plate; and a portion of the first coil extending in the direction perpendicular to the base plate may be disposed in the slot.

The wireless power transmitter of may further include a second coil having a three-dimensional spiral shape disposed on the side surface of the structure so that the second coil does not overlap the first coil and configured to generate a magnetic field in the direction perpendicular to the side surface of the structure.

The structure may include a slot formed in the side surface of the structure and extending in a direction perpendicular to the base plate; and a portion of the first coil extending in the direction perpendicular to the base plate and a portion of the second coil extending in the direction perpendicular to the base plate may be disposed in the slot.

The structure may include a groove formed in the side surface of the structure and extending in a direction perpendicular to the base plate; and an end portion of the first coil may be disposed in the groove.

Portions of the first coil extending in a direction perpendicular to the base plate may overlap each other.

The structure may include a groove formed in the side surface of the structure and extending in the direction perpendicular to the base plate; and at least a portion of the first coil extending in the direction perpendicular to the base plate may be disposed in the slot.

Portions of the first coil may overlap each other.

The first coil may include a plurality of windings; and an inter-winding spacing of the first coil may decrease toward a center of the first coil.

The wireless power transmitter may further include a transmitting core disposed in the structure.

The wireless power transmitter may further include a transmitting core disposed in the base plate.

In another general aspect, a wireless power transmitter includes a base plate; a structure disposed on a surface of the base plate; and a first coil disposed on a side surface of the structure, the side surface of the structure extending away from the surface of the base plate, the first coil being configured to generate a magnetic field in a plurality of directions parallel to the surface of the base plate.

A first end of the structure may be disposed on the surface of the base plate; and the wireless transmitter may further include a second coil disposed on an end surface of the structure at a second end of the structure opposite to the first end of the structure, the second coil being configured to generate a magnetic field perpendicular to the end surface of the structure.

The wireless power transmitter may further include a second coil disposed on the side surface of the structure so that the second coil does not overlap the first coil, the second coil being configured to generate a magnetic field in a plurality of directions parallel to the surface of the base plate that are different from the plurality of directions in which the first coil is configured to generate a magnetic field.

The structure may include a slot formed in the side surface of the structure and extending in a direction perpendicular to the plurality of directions in which the first coil is configured to generate the magnetic field; and a portion of the first coil extending in the direction in which the slot extends may be disposed in the slot.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary in the art.

Figure 1:
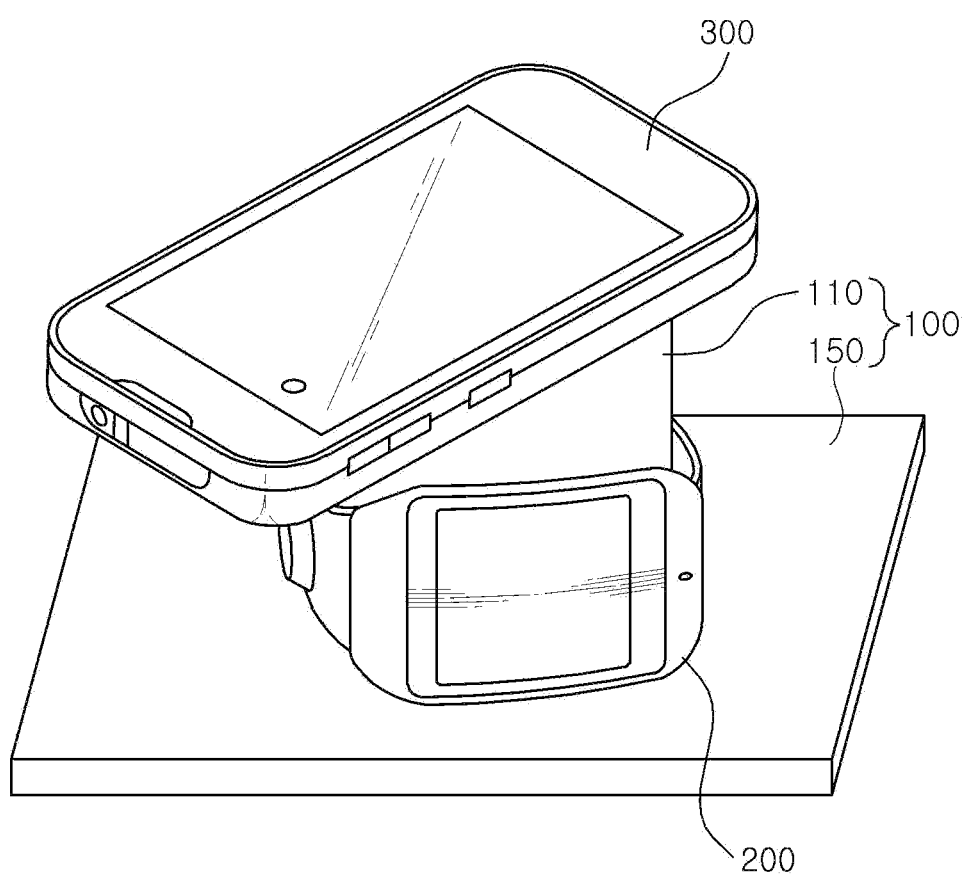
FIG. 1 is a view illustrating an example of the use of a wireless power transmitter.

FIG. 1 is a view illustrating an example of the use of a wireless power transmitter.

The wireless power receivers 200 and 300 include a wireless power receiver 200, such as a wearable device including a smartwatch, having a surface on which a receiving coil is formed that is difficult to position parallel to a base plate 150 of a wireless power transmitter 100, and a wireless power receiver 300, such as a cellular phone, a smartphone, and a tablet PC, having a surface on which a receiving coil is formed that is easy to position parallel to the base plate 150. A structure 110 is disposed on the base plate 150.

As illustrated in FIG. 1, power receiving surfaces of the wireless power receivers 200 and 300 are oriented toward a side surface and an upper surface of the wireless power transmitter 100, respectively, according to the shapes thereof, so as to wirelessly receive power.

The wireless power transmitter 100 generates either one or both of an electric field and a magnetic field having a sufficient intensity for transmitting wireless power through the side surface of the wireless power transmitter 100 as well as through the upper surface of the wireless power transmitter 100. Therefore, the wireless power transmitter 100 can wirelessly transmit power to the wireless power receiver 200, such as a wearable device, as well as the wireless power receiver 300, such as a cellular phone and a smartphone, with high a transmission efficiency.

Figure 2:
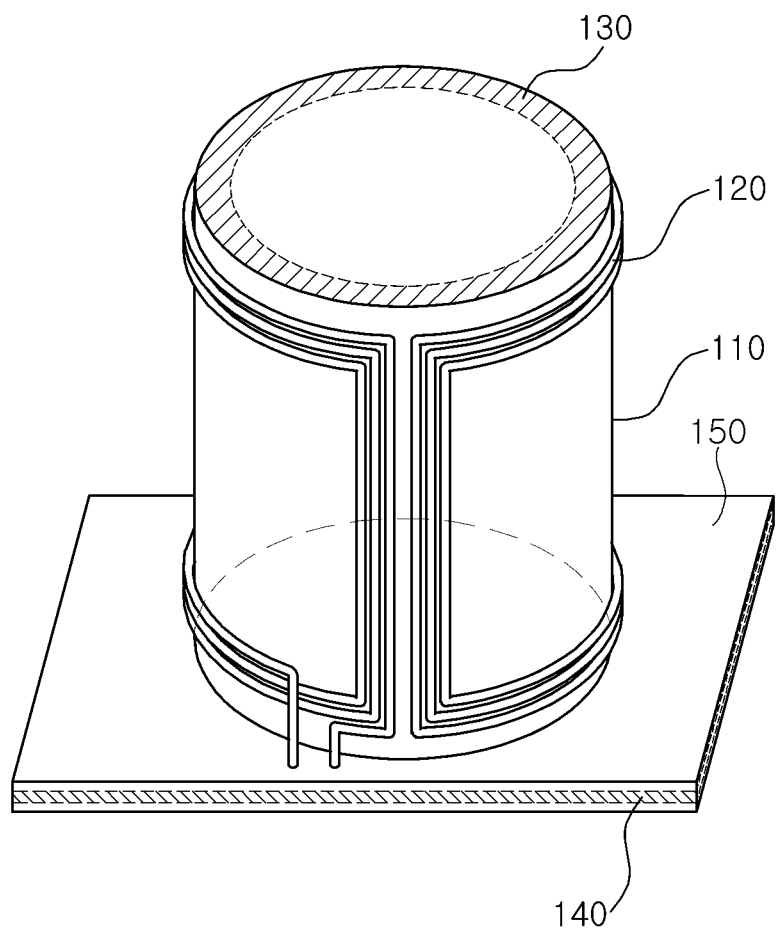
FIGS. 2 through 14 are views illustrating examples of configurations of various wireless power transmitters.

FIG. 2 illustrates an example of a configuration of a wireless power transmitter 100-1. The wireless power transmitter 100-1 includes a case including a base plate 150 and a structure 110 disposed on the base plate 150, and a transmitting coil 120 constituted by a single wire disposed on a side surface of the structure 110 of the case. In the example illustrated in FIG. 2, the wireless power transmitter 100-1 also includes a first transmitting core 130 disposed in the structure 110 of the case and a second transmitting core 140 disposed in the base plate 150 of the case. However, either one or both of the first transmitting core 130 and the second transmitting core 140 may be omitted.

In the example illustrated in FIG. 2, the structure 110 of the case has a cylindrical shape, but it may have other shapes.

As illustrated in FIG. 2, the transmitting coil 120 is constituted by a single wire having a three-dimensional (3D) spiral shape on the side surface of the structure 110 of the case. Therefore, either one or both of an electric field and a magnetic field is generated in a direction perpendicular to the side surface of the structure 110 of the case by the transmitting coil 120 and parallel to a surface of the base plate 150 on which the structure 110 is disposed, thereby improving a transmission efficiency of the power that is wirelessly transmitted to the wireless power receiver 200 (FIG. 1) disposed to be parallel to the side surface of the wireless power transmitter 100-1. In addition, since the transmitting coil 120 has the 3D spiral shape, the transmitting coil 120 may be freely designed to have a desired degree of inductance. Also, since the transmitting coil wraps around the side surface of the structure 110 as illustrated in FIG. 2, the transmitting coil 120 generates the either one or both of the electric field and the magnetic field in a plurality of directions perpendicular to the side surface of the structure 110 and parallel to the surface of the base plate 150 on which the structure 110 is disposed. This enables the wireless power receiver 200 to be positioned parallel to the side surface of the structure 110 at a plurality of different orientations on the base plate 150, thereby enabling the wireless power transmitter 200 to receive power from the wireless power transmitter 100 with a high efficiency at the plurality of different orientations.

Although not illustrated in FIG. 2, a power supplying circuit supplying power to the transmitting coil 120 may be disposed in the case.

As described above, the wireless power transmitter 100-1 also includes the first transmitting core 130 disposed in the structure 110 of the case. Since the wireless power transmitter 100-1 includes the first transmitting core 130, the efficiency of power transmission to the wireless power receiver 200 disposed to be parallel to the side surface of the structure 110 of the case may be improved. However, the first transmitting core 130 may be omitted.

In addition, the wireless power transmitter 100-1 also includes the second transmitting core 140 disposed in the base plate 150 of the case. Since the wireless power transmitter 100-1 includes the second transmitting core 140, power transmissions to the wireless power receivers 200 and 300 may be smoothly performed even in a case in which the wireless power transmitter 100 is disposed on a table containing a metallic material. However, the second transmitting core 140 may be omitted.

Either one or both of the first transmitting core 130 and the second transmitting core 140 may include a substrate or a magnetic transmitting core. The magnetic transmitting core may be made of a material having a predetermined degree of magnetism. For example, the magnetic transmitting core may be made of a resin material including metal powder particles. Alternatively, the magnetic transmitting core may be made of a ferrite sheet (which may include a NiZnCu/MnZn-based metal), a sendust-based metal, a permalloy-based metal, an amorphous magnetic body, or any combination of any two or more thereof.

Figure 3:
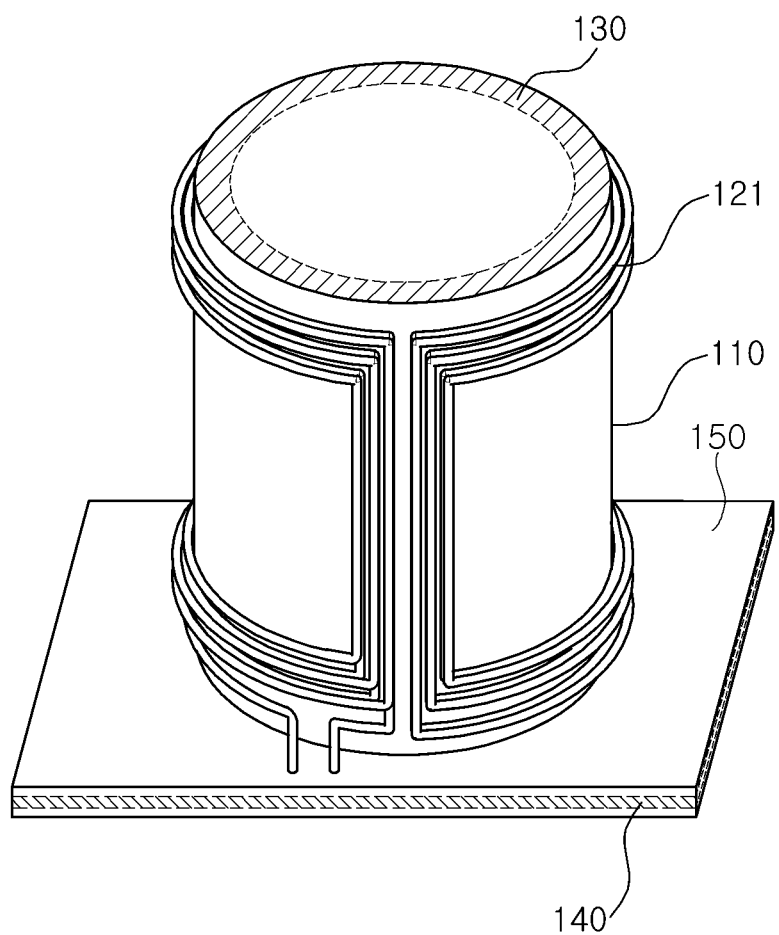

FIG. 3 illustrates an example of a configuration of another wireless power transmitter 100-2. The wireless power transmitter 100-2 includes the case including the base plate 150 and the structure 110 disposed on the base plate, and a transmitting coil 121 constituted by a single wire disposed on the side surface of the structure 110 of the case. In the example illustrated in FIG. 3, the wireless power transmitter 100-2 also includes the first transmitting core 130 disposed in the structure 110 of the case and the second transmitting core 140 disposed in the base plate 150 of the case. However, either one or both of the first transmitting core 130 and the second transmitting core 140 may be omitted.

As illustrated in FIG. 3, the transmitting coil 121 includes a plurality of layers in a direction perpendicular to the side surface of the structure 110 of the case. Since the transmitting coil 121 includes the plurality of layers, the intensity of either one or both of a magnetic field and an electric field generated in the direction perpendicular to the side surface of the structure 110 of the case is increased, and thereby further improving the efficiency of the wireless power transmission to the wireless power receiver 200 (FIG. 1) disposed to be parallel to the side surface of the wireless power transmitter 100-2.

Functions and effects of the wireless power transmitter illustrated in FIG. 3 may be easily understood with reference to the description of FIG. 2.

Figure 4:
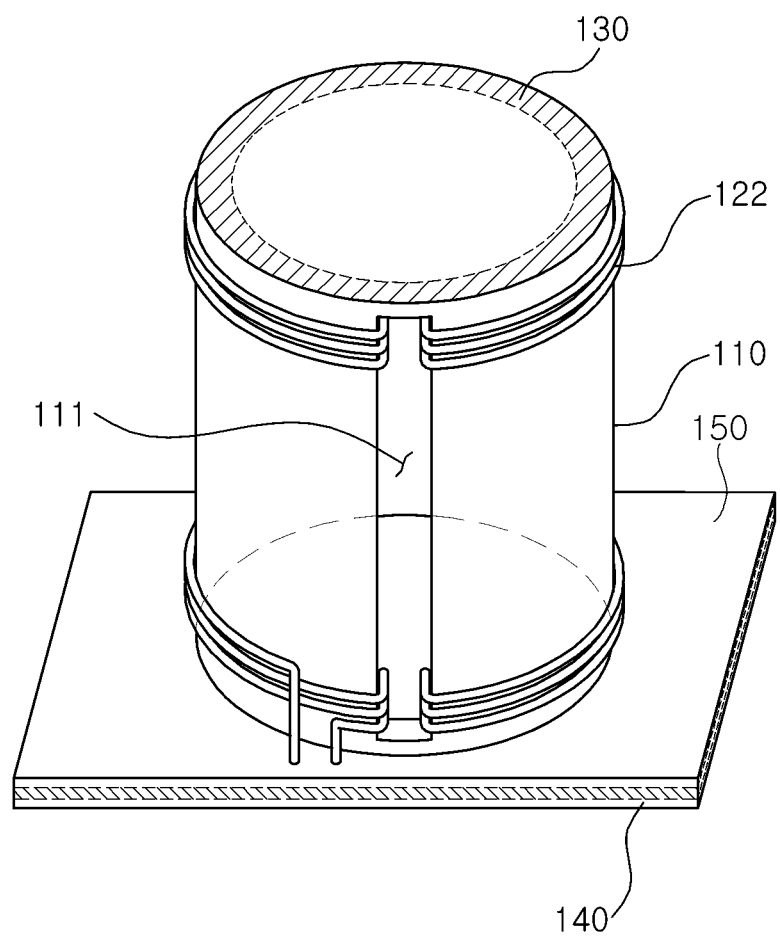
Figure 5:
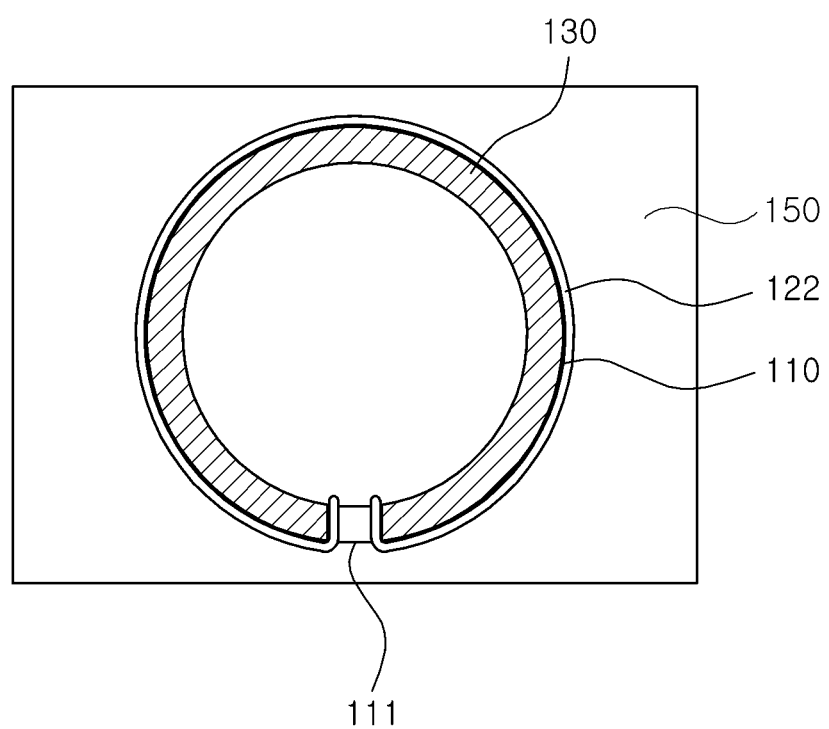

FIG. 4 illustrates an example of a configuration of another wireless power transmitter 100-3. The wireless power transmitter 100-3 includes the case including the base plate 150 and the structure 110 disposed on the base plate 150, a transmitting coil 122 constituted by a single wire disposed on the side surface of the structure 150 of the case, and a slot 111 is formed in the side surface of the structure 110 of the case. FIG. 5 is a plan view of the wireless power transmitter 100-3 illustrated in FIG. 4. In the example illustrated in FIGS. 4 and 5, the wireless power transmitter 100-3 also includes the first transmitting core 130 disposed in the structure 110 of the case and the second transmitting core 140 disposed in the base plate 150 of the case. However, either one or both of the first transmitting core 130 and the second transmitting core 140 may be omitted.

As illustrated in FIGS. 4 and 5, the slot 111 is formed in the side surface of the structure 110 of the case of the wireless power transmitter 100-3, and a portion of the transmitting coil 122 extending in a direction perpendicular to the base plate 150 of the case is disposed in the slot 111. In the case of the wireless power transmitter 100-3 illustrated in FIG. 4, there is no region in which the intensity of either one or both of an electric field and a magnetic field generated in the direction perpendicular to the side surface of the wireless power transmitter 100-3 is decreased. As a result, since a user can place the wireless power receiver 200 on the wireless power transmitter 100-3 without regard to a position of the wireless power receiver 200, a user convenience in using the wireless power transmitter 100-3 is improved.

Although FIGS. 4 and 5 illustrate that the first transmitting core 130 is not disposed in the slot 111, the first transmitting core 130 may be disposed in the slot 111. In this case, the transmitting coil 122 may be extended to the inside of the first transmitting core 130 through a hole in the first transmitting core 130 and may be extended in the direction perpendicular to the base plate 150 inside the first transmitting core 130. Alternatively, the transmitting coil 122 may be extended between the first transmitting core 130 and the structure 110 of the case and may be extended in the direction perpendicular to the base plate 150 inside the structure 110.

Figure 6:
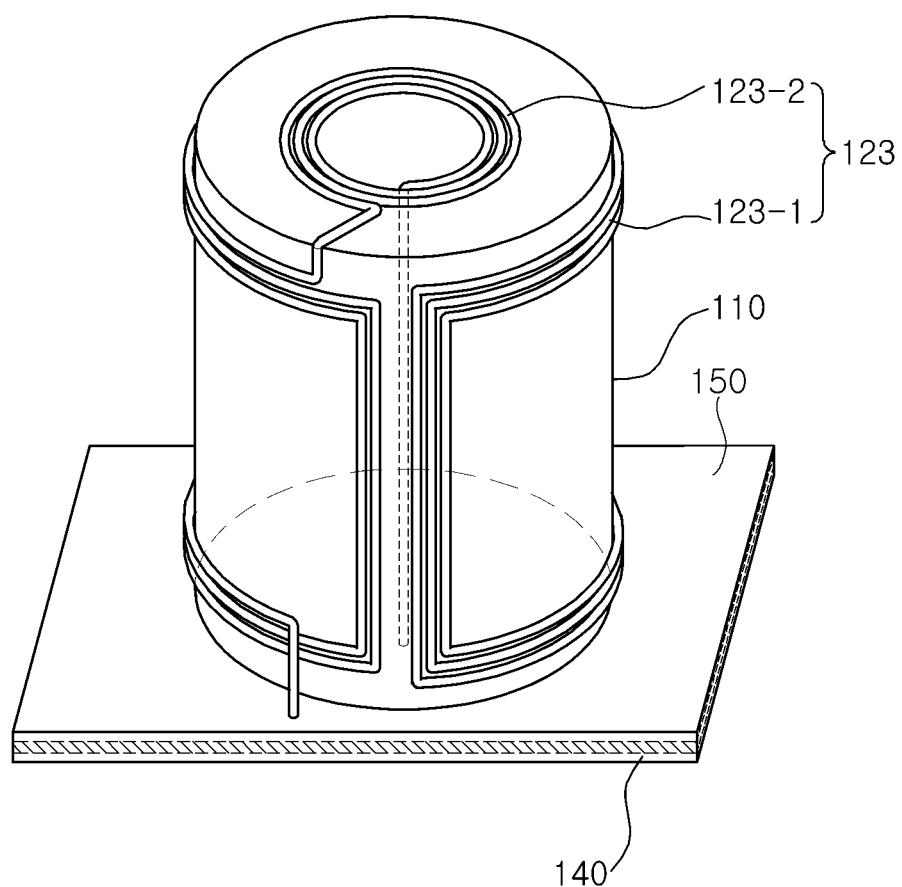

FIG. 6 illustrates an example of a configuration of another wireless power transmitter 100-4. The wireless power transmitter 100-4 includes the case including the base plate 150 and the structure 110 disposed on the base plate 150, and a transmitting coil 123 constituted by a single wire disposed on the side surface of the structure 110 of the case. In the example illustrated in FIG. 6, the wireless power transmitter 100-4 also includes the second transmitting core 140 disposed in the base plate 150 of the case. However, the second transmitting core 140 may be omitted.

As illustrated in FIG. 6, the transmitting coil 123 extends inside the structure 110 of the case, and includes an upper transmitting coil 123-2 formed on the upper surface of the structure 110 of the case, and a side transmitting coil 123-1 formed on the side surface of the structure 110 of the case. In the example illustrated in FIG. 6, both of the upper transmitting coil 123-2 and the side transmitting coil 123-1 have a spiral shape, but they may have other shapes.

As illustrated in FIG. 6, the wireless power transmitter 100-4 generates either one or both of an electric field and a magnetic field having a sufficient intensity in the direction perpendicular to the upper surface of the wireless power transmitter 100-4 by having a transmitting coil (i.e., the upper transmitting coil 123-2) disposed on the upper surface of the wireless power transmitter 100-4. Therefore, the wireless power transmitter 100-4 illustrated in FIG. 6 may also wirelessly transmit the power to the wireless power receiver 300 (FIG. 1) disposed on the wireless power transmitter 100-4 more efficiently.

Although not illustrated in FIG. 6, the wireless power transmitter 100-4 may also include the first transmitting core 130 disposed in the structure 110 of the case.

Figure 7:
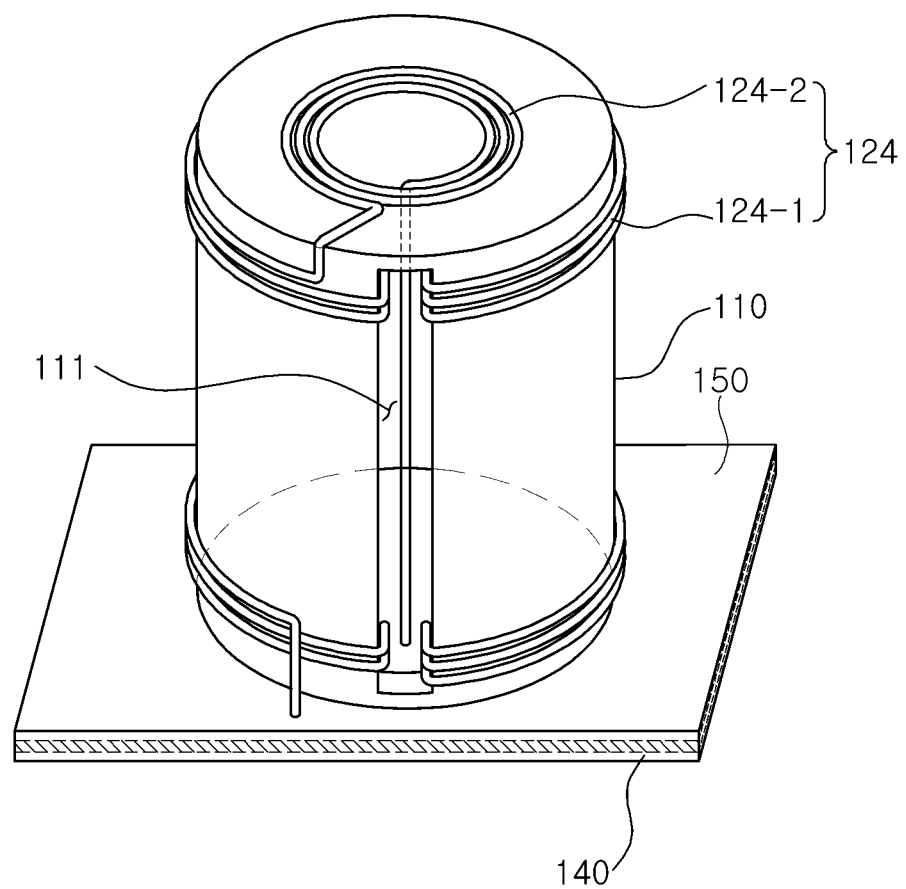

FIG. 7 illustrates an example of a configuration of another wireless power transmitter 100-5. The wireless power transmitter 100-5 includes the case including the base plate 150 and the structure 110 disposed on the base plate 150, and a transmitting coil 124 constituted by a single wire disposed on the side surface of the structure 110 of the case, and the slot 111 is formed in the side surface of the structure 110 of the case. In the example illustrated in FIG. 7, the wireless power transmitter 100-5 also includes the second transmitting core 140 disposed in the base plate 150 of the case. However, the second transmitting core 140 may be omitted.

As illustrated in FIG. 7, the transmitting coil 124 includes an upper transmitting coil 124-2 and a side transmitting coil 124-1. In addition, as illustrated in FIG. 7, the slot 111 is formed in the side surface of the structure 110 of the wireless power transmitter 100-5, and a portion of the side transmitting coil 124-1 of the transmitting coil 124 extending in a direction perpendicular to the base plate 150 is disposed in the slot 111.

In the wireless power transmitter 100-5 illustrated in FIG. 7, since there is no region in which the intensity of either one or both of an electric field and a magnetic field generated in a direction perpendicular to the side surface of the wireless power transmitter 100-5 is decreased, a user convenience is improved, and the power may also be wirelessly transmitted to the wireless power receiver 300 (FIG. 1) disposed on the wireless power transmitter 100-5 more efficiently.

Although not illustrated in FIG. 7, the wireless power transmitter 100-5 may further include the first transmitting core 130 disposed in the structure 110 of the case. In this case, the first transmitting core 130 may be disposed in the slot 111 or may not be disposed in the slot 111. In either case, the shape of the transmitting coil 124 may be easily understood with reference to FIG. 4 and its description.

Figure 8:
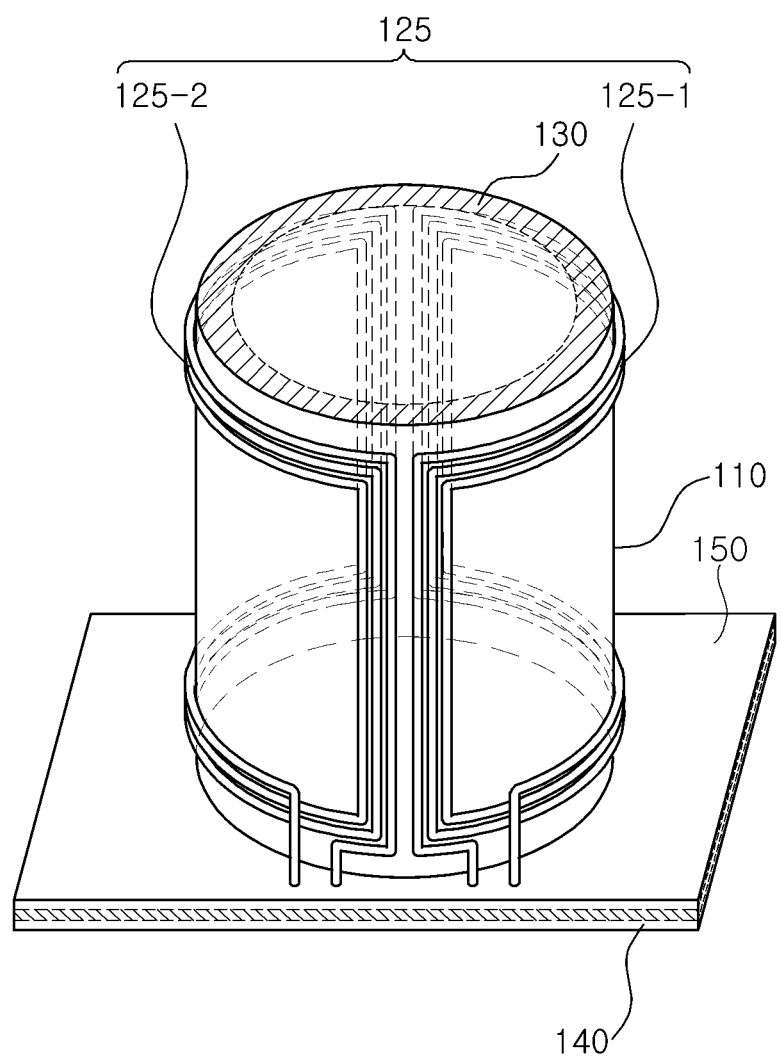

FIG. 8 is a view illustrating an example of a configuration of another wireless power transmitter 100-6. The wireless power transmitter 100-6 includes the case including the base plate 150 and the structure 110 disposed on the base plate 150, and a transmitting coil 125 including a first transmitting coil 125-1 constituted by a single wire disposed on a first region of the side surface of the structure 110 of the case, and a second transmitting coil 125-2 constituted by a single wire disposed on a second region of the side surface of the structure 110 of the case that does not overlap the first region of the side surface of the structure 110 of the case. In the example illustrated in FIG. 8, the wireless power transmitter 100-6 also includes the first transmitting core 130 disposed in the structure 110 of the case and the second transmitting core 140 disposed in the base plate 150 of the case. However, either one or both of the first transmitting core 130 and the second transmitting core 140 may be omitted.

As illustrated in FIG. 8, the wireless power transmitter 100-6 includes the first transmitting coil 125-1 disposed on the first region of the structure 110 of the case, and the second transmitting coil 125-2 disposed on the second region of the structure 110 of the case and electrically isolated from the first transmitting coil 125-1. Therefore, by selectively operating one of the first transmitting coil 125-1 and the second transmitting coil 125-2 depending on a position of the wireless power receiver 200 (FIG. 1), power transmission efficiency may be improved. Although FIG. 8 illustrates a case in which the wireless power transmitter 100-6 includes the first transmitting coil 125-1 and the second transmitting coil 125-2, the structure 110 may be divided into more than two regions and more than two transmitting coils may be on respective ones of the more than two regions.

Figure 9:
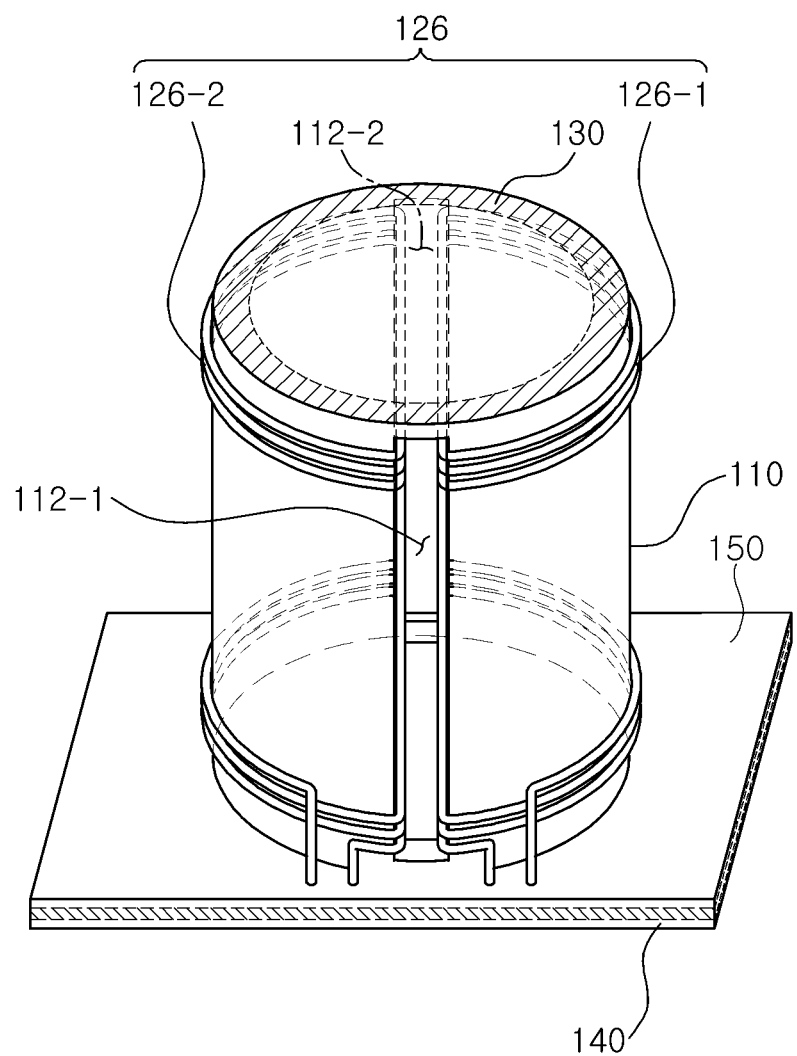

FIG. 9 is a view illustrating an example of a configuration of another wireless power transmitter 100-7. The wireless power transmitter 100-7 includes the case including the base plate 150 and the structure 110 disposed on the base plate 150, and a transmitting coil 126 including a first transmitting coil 126-1 constituted by a single wire disposed on a first region of the side surface of the structure 110 of the case, and a second transmitting coil 126-2 constituted by a single wire disposed on a second region of the side surface of the structure 110 of the case that does not overlap the first region of the side surface of the structure 110 of the case, and a first slot 112-1 and a second slot 112-2 are formed in the side surface of the structure 110 of the case. In the example illustrated in FIG. 9, the wireless power transmitter 100-7 also includes the first transmitting core 130 disposed in the structure 110 of the case and the second transmitting core 140 disposed in the base plate 150 of the case. However, either one or both of the first transmitting core 130 and the second transmitting core 140 may be omitted.

As illustrated in FIG. 9, portions of the first transmitting coil 126-1 and the second transmitting coil 126-2 extending in the direction perpendicular to the base plate 150 are disposed in the first slot 112-1 and the second slot 112-2, respectively.

In the wireless power transmitter 100-7 illustrated in FIG. 9, since there is no region in which the intensity of either one or both of an electric field and a magnetic field generated in the direction perpendicular to the side surface of the wireless power transmitter 100-7 is decreased, a user convenience may be improved, and the power transmission efficiency may be improved by selectively operating either one or both of the first transmitting coil 126-1 and the second transmitting coil 126-2 depending on the position of the wireless power receiver 200 (FIG. 1).

Although FIG. 9 illustrates a case in which the first transmitting core 130 is not disposed in the first slot 112-1 and the second slot 112-2, the first transmitting core 130 may be disposed in the first slot 112-1 and the second slot 112-2. In either case, the shapes of the first transmitting coil 125-1 and the second transmitting coil 125-2 may be easily understood with reference to FIG. 4 and its description.

Figure 10:
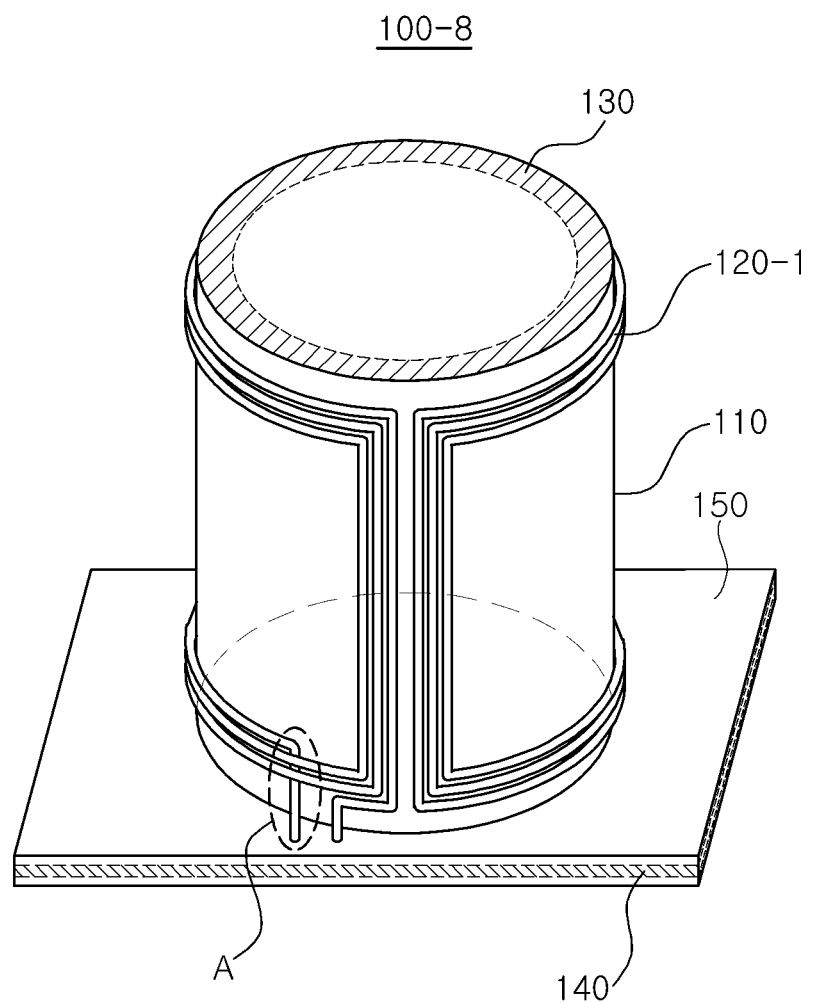
Figure 11:
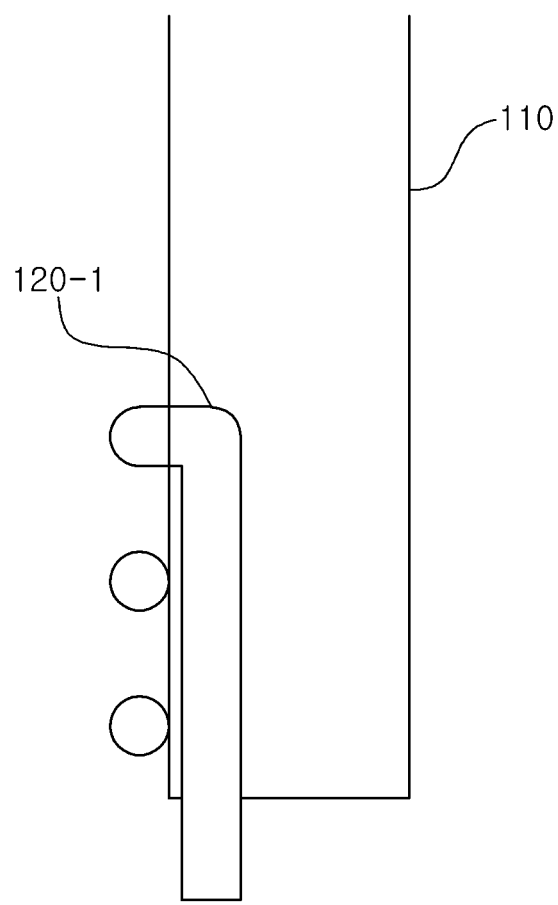

FIG. 10 illustrates an example of a configuration of another wireless power transmitter 100-8, and FIG. 11 is a view of a portion A of FIG. 10. The wireless power transmitter 100-8 includes the case including the base plate 150 and the structure 110 disposed on the base plate 150, and a transmitting coil 120-1 constituted by a single wire disposed on the side surface of the structure 110 of the case. An end portion of the transmitting coil 120-1 is disposed underneath other portions of the transmitting coil 120-1. To this end, a groove having a predetermined depth is formed in the structure 110.

In the example illustrated in FIG. 10, the wireless power transmitter 100-8 also includes the first transmitting core 130 disposed in the structure 110 of the case and the second transmitting core 140 disposed in the base plate 150 of the case. However, either one or both of the first transmitting core 130 and the second transmitting core 140 may be omitted.

In the example illustrated in FIG. 10, the structure 110 of the case has a cylindrical shape, but it may have other shapes.

The wireless power transmitter 100-8 illustrated in FIG. 10 is the same as the wireless power transmitter 100-1 illustrated in FIG. 2, except that the end portion of the transmitting coil 120-1 is disposed in the groove formed in the structure 110 underneath other portions of the transmitting coil 120-1. By designing the wireless power transmitter 100-8 as illustrated in FIG. 10, a degree of freedom in designing the wireless power transmitter 100-8 is improved.

Figure 12:
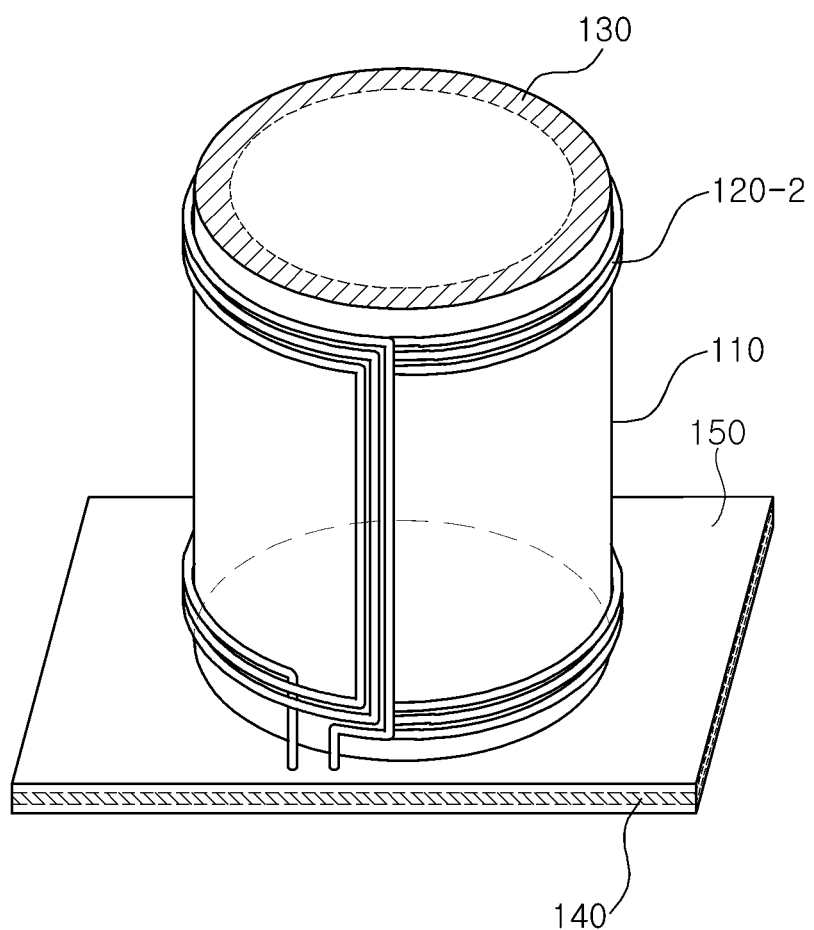

FIG. 12 illustrates an example of a configuration of another wireless power transmitter 100-9. The wireless power transmitter 100-9 includes the case including the base plate 150 and the structure 110 disposed on the base plate 150, and a transmitting coil 120-2 constituted by a single wire disposed on the side surface of the structure 110 of the case. As illustrated in FIG. 12, portions of the transmitting coil 120-2 extending in the direction perpendicular to the base plate 150 overlap each other. To this end, a groove may be formed in the structure 110, which may be easily understood with reference to FIGS. 10 and 11 and their description.

In the example illustrated in FIG. 12, the wireless power transmitter 100-9 also includes the first transmitting core 130 disposed in the structure 110 of the case and the second transmitting core 140 disposed in the base plate 150 of the case. However, either one or both of the first transmitting core 130 and the second transmitting core 140 may be omitted.

In the example illustrated in FIG. 12, the structure 110 of the case has a cylindrical shape, but it may have other shapes.

The wireless power transmitter 100-9 illustrated in FIG. 12 is the same as the wireless power transmitter 100-1 illustrated in FIG. 2, except that the end portion of the transmitting coil 120-2 is disposed in the groove formed in the structure 110 underneath other portions of the transmitting coil 120-2, and the portions of the transmitting coil 120-2 extending in the direction perpendicular to the base plate 150 are formed to overlap each other. By designing the wireless power transmitter 100-9 as illustrated in FIG. 12, a degree of freedom in designing the wireless power transmitter 100-9 is improved, and a region in which the intensity of either one or both of a magnetic field and an electric field generated in the direction perpendicular to the side surface of the wireless power transmitter is decreased is reduced.

Figure 13:
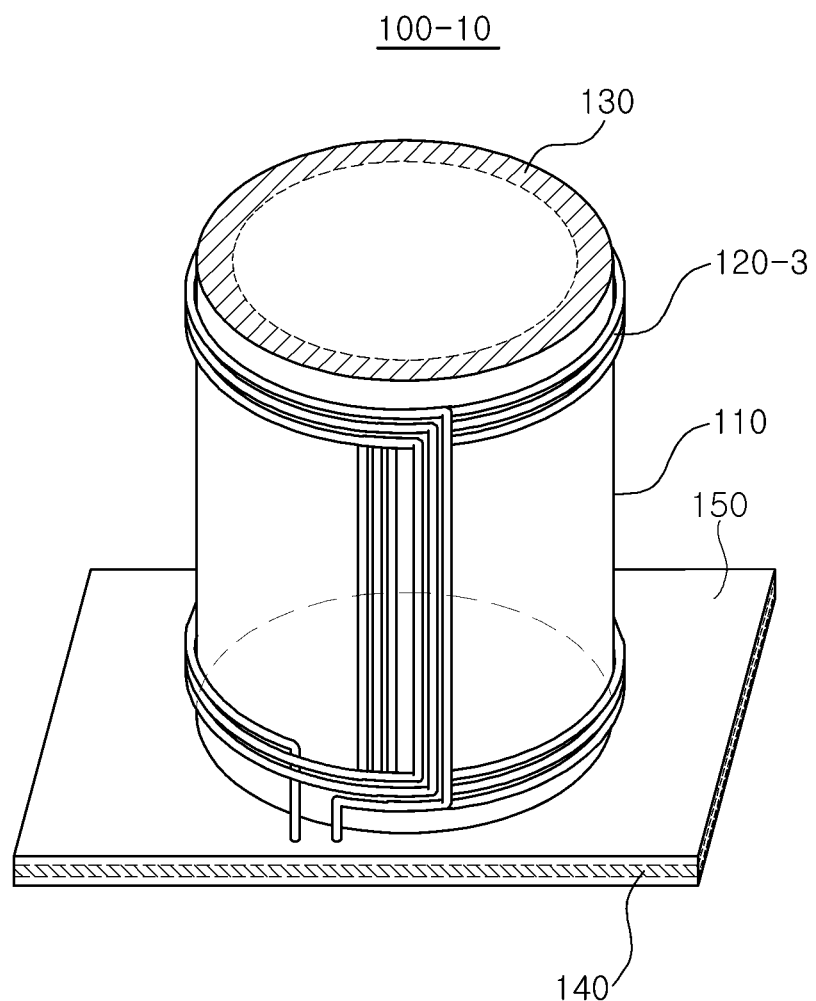

FIG. 13 illustrates an example of a configuration of another wireless power transmitter 100-10. The wireless power transmitter 100-10 includes the case including the base plate 150 and the structure 110 disposed on the base plate 150, and a transmitting coil 120-3 constituted by a single wire disposed on the side surface of the structure 110 of the case. As illustrated in FIG. 13, portions of the transmitting coil 120-3 overlap each other. To this end, a groove may be formed in the structure 110, which may be easily understood with reference to FIGS. 10 and 11 and their description.

In the example illustrated in FIG. 13, the structure 110 of the case has a cylindrical shape, but it may have other shapes.

In the example illustrated in FIG. 13, the wireless power transmitter 100-10 also includes the first transmitting core 130 disposed in the structure 110 of the case and the second transmitting core 140 disposed in the base plate 150 of the case. However, either one or both of the first transmitting core 130 and the second transmitting core 140 may be omitted.

The wireless power transmitter 100-10 illustrated in FIG. 13 is the same as the wireless power transmitter 100-1 illustrated in FIG. 2, except that the end portion of the transmitting coil 120-3 is disposed in the groove formed in the structure 110 underneath other portions of the transmitting coil 120-3, and portions of the transmitting coil 120-3 overlap each other. By designing the wireless power transmitter 100-10 as illustrated in FIG. 13, a degree of freedom in designing the wireless power transmitter 100-10 is improved, and a region in which the intensity of either one or both of a magnetic field and an electric field generated in the direction perpendicular to the side surface of the wireless power transmitter is decreased is divided so that the position of the wireless power receiver 200 (FIG. 1) to be charged may be more freely selected.

Figure 14:
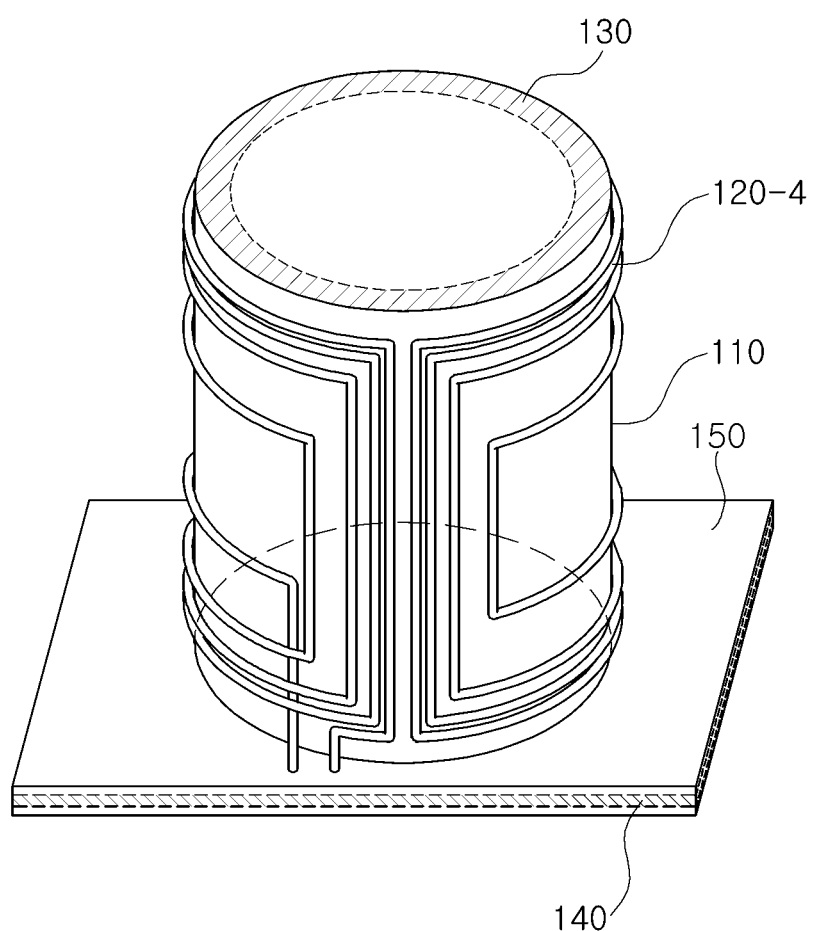

FIG. 14 illustrates an example of a configuration of another wireless power transmitter 100-11. The wireless power transmitter 100-11 includes the case including the base plate 150 and the structure 110 disposed on the base plate 150, and a transmitting coil 120-4 constituted by a single wire disposed on the side surface of the structure 110 of the case. As illustrated in FIG. 14, the transmitting coil 120-4 has an inter-winding spacing that increases toward the center of the transmitting coil 120-4.

In the example illustrated in FIG. 14, the wireless power transmitter 100-11 also includes the first transmitting core 130 disposed in the structure 110 of the case and the second transmitting core 140 disposed in the base plate 150 of the case. However, either one or both of the first transmitting core 130 and the second transmitting core 140 may be omitted.

In the example illustrated in FIG. 14, the structure 110 of the case has a cylindrical shape, but it may have other shapes.

The wireless power transmitter 100-11 illustrated in FIG. 14 is the same as the wireless power transmitter 100-1 illustrated in FIG. 2, except that the end portion of the transmitting coil 120-4 is disposed in the groove formed in the structure 110 underneath other portions of the transmitting coil 120-4 and the inter-winding spacing of the transmitting coil 120-4 increases toward the center of the transmitting coil 120-4. By designing the wireless power transmitter 100-11 as illustrated in FIG. 14, a degree of freedom in designing the wireless power transmitter 100-11 is improved, and deviations in the intensity of either one or both of a magnetic field and an electric field generated in the direction perpendicular to the side surface of the wireless power transmitter are decreased in the central and outer portions of the transmitting coil 120-4. That is, a difference between the intensity of either one or both of the magnetic field and the electric field in the center of the transmitting coil 120-4 and the intensity of either one or both of the magnetic field and the electric field in the outer portion of the transmitting coil 120-4 is decreased.

Although not illustrated in FIGS. 2 through 14, the wireless power transmitters may further include a cover for protecting the transmitting coil or coils.

In the examples described above, the wireless power transmitter is able to wirelessly transmit power to various wireless power receivers, such as wearable devices and mobile devices, with a high transmission efficiency.

While this disclosure includes specific examples, it will be apparent to one of ordinary skill in the art that various changes in form and details be made in these examples without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a case comprising a base plate and a structure disposed on the base plate;
   a slot formed in a side surface of the structure and extending in a direction perpendicular to the base plate;
   a first coil having a spiral shape disposed on the side surface of the structure and configured to generate a magnetic field in a direction perpendicular to the side surface of the structure,
   wherein a portion of the first coil is disposed in the slot in a direction that is parallel to the base plate.

2. The wireless power transmitter of claim 1, wherein the first coil is constituted by a single wire.

3. The wireless power transmitter of claim 1, wherein the first coil comprises a plurality of layers in the direction perpendicular to the side surface of the structure.

4. The wireless power transmitter of claim 1,
   wherein a portion of the first coil extending in the direction perpendicular to the base plate is disposed in the slot.

5. The wireless power transmitter of claim 1, wherein a first end of the structure is disposed on the base plate; and
   the wireless power transmitter further comprises a second coil having a spiral shape disposed on an end surface of the structure, wherein the end surface of the structure is at a second end of the structure opposite to the first end of the structure.

6. The wireless power transmitter of claim 5, wherein the first coil and the second coil are constituted by a single wire that forms both the first coil and the second coil.

7. The wireless power transmitter of claim 5, wherein the structure comprises a slot formed in the side surface of the structure and extending in a direction perpendicular to the base plate; and
   a portion of the first coil extending in the direction perpendicular to the base plate is disposed in the slot.

8. The wireless power transmitter of claim 1, further comprising a second coil having a spiral shape disposed on the side surface of the structure so that the second coil does not overlap the first coil and the second coil is configured to generate a magnetic field of the second coil in the direction perpendicular to the side surface of the structure.

9. The wireless power transmitter of claim 8, wherein the structure comprises a slot formed in the side surface of the structure and extending in a direction perpendicular to the base plate; and
a portion of the first coil extending in the direction perpendicular to the base plate and a portion of the second coil extending in the direction perpendicular to the base plate are disposed in the slot.

10. The wireless power transmitter of claim 1, wherein the structure comprises a groove formed in the side surface of the structure and extending in a direction perpendicular to the base plate; and
an end portion of the first coil is disposed in the groove.

11. The wireless power transmitter of claim 1, wherein portions of the first coil extending in a direction perpendicular to the base plate overlap each other.

12. The wireless power transmitter of claim 11, wherein the structure comprises a groove formed in the side surface of the structure and extending in the direction perpendicular to the base plate; and
at least a portion of the first coil extending in the direction perpendicular to the base plate is disposed in the groove.

13. The wireless power transmitter of claim 1, wherein portions of the first coil overlap each other.

14. The wireless power transmitter of claim 1, wherein first coil comprises a plurality of windings; and
an inter-winding spacing of the first coil increases toward a center of the first coil.

15. The wireless power transmitter of claim 1, further comprising a transmitting core disposed in the structure.

16. The wireless power transmitter of claim 1, further comprising a transmitting core disposed in the base plate.

17. A wireless power transmitter comprising:
a base plate;
a structure disposed on a surface of the base plate, the structure comprising a slot formed in a side surface of the structure and extending in a direction perpendicular to the first plurality of directions of the first magnetic field; and
a first coil disposed on the side surface of the structure, the side surface of the structure extending away from the surface of the base plate, the first coil being configured to generate a first magnetic field in a first plurality of directions parallel to the surface of the base plate,
wherein a portion of the first coil is disposed in the slot in a direction that is parallel to the base plate.

18. The wireless power transmitter of claim 17, wherein a first end of the structure is disposed on the surface of the base plate; and
the wireless transmitter further comprises a second coil disposed on an end surface of the structure, wherein the end surface of the structure is at a second end of the structure opposite to the first end of the structure, the second coil being configured to generate a magnetic field of the second coil perpendicular to the end surface of the structure.

19. The wireless power transmitter of claim 17, further comprising a second coil disposed on the side surface of the structure so that the second coil does not overlap the first coil, the second coil being configured to generate a second magnetic field in a second plurality of directions parallel to the surface of the base plate, wherein the second plurality of directions are different from the first plurality of directions of the first coil.

20. The wireless power transmitter of claim 17,
wherein a portion of the first coil extending in the direction in which the slot extends is disposed in the slot.

* * * * *